Dec. 23, 1958      D. A. WATT      2,865,291

PUMPS FOR LIQUID CURRENT-CONDUCTING MATERIAL

Filed May 23, 1952      2 Sheets-Sheet 1

DUDLEY ALBERT WATT,
Inventor

By Robert B Pearson

Attorney

Dec. 23, 1958   D. A. WATT   2,865,291
PUMPS FOR LIQUID CURRENT-CONDUCTING MATERIAL
Filed May 23, 1952   2 Sheets-Sheet 2

DUDLEY ALBERT WATT,
Inventor
By
Attorney

United States Patent Office 2,865,291
Patented Dec. 23, 1958

2,865,291

PUMPS FOR LIQUID CURRENT-CONDUCTING MATERIAL

Dudley Albert Watt, Oxford, England, assignor, by mesne assignments, to the United States of America as represented by the United States Atomic Energy Commission Application May 23, 1952, Serial No. 289,684

Claims priority, application Great Britain May 23, 1951

2 Claims. (Cl. 103—1)

This invention relates to pumps for liquid current-conducting material, such as liquid metal, wherein the liquid is moved in a duct by the interaction of alternating magnetic fields and current loops induced by those fields. This type of pump is hereinafter referred to as an induction type liquid-conductor pump.

By "alternating magnetic fields" is meant fields alternating in intensity with time at a fixed point on the duct. Such fields are produced by static poles A. C. energized from a single phase or a polyphase supply or by moving poles D. C. energized.

In one form of induction type liquid conductor pump for liquid metals the alternating magnetic fields are generated by polyphase windings so as to set up a travelling field and a simple pump may consist of a flat rectangular-section duct and means for generating a wave of magnetic field across the smaller dimension of the duct and travelling along the duct whereby E. M. F.'s are induced to circulate currents in the liquid metal in the plane of the larger dimension of the duct. Inter-action between the magnetic field and the currents produces a pressure in the metal so that it flows along the duct in the direction of travel of the magnetic field, the action may be compared in fact with a linearly developed induction type A. C. motor.

In this simple pump most of the current loops lie wholly in the liquid metal so that components of current flow are set up parallel to the liquid metal flow. These components set up pressures that result in turbulence and eddies, with consequent heating losses to the detriment of the efficiency of the pump.

According to the invention an induction type liquid-conductor pump comprises a duct and conductor means associated with the duct to provide a path of lower impedance along the duct than that offered by the liquid along the duct so that the induced currents in the liquid in the duct are substantially wholly transverse to the general directions of flow of the liquid in the duct.

Figure 6:
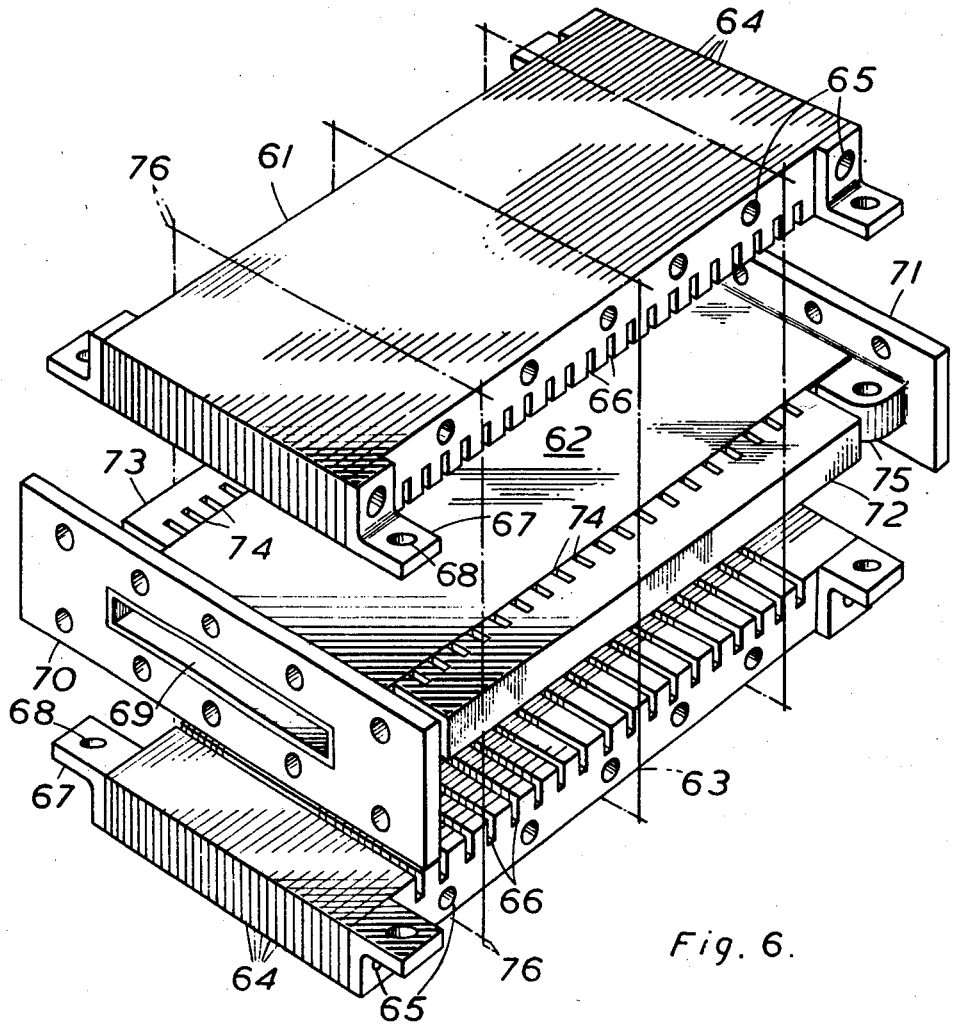
Figure 7:
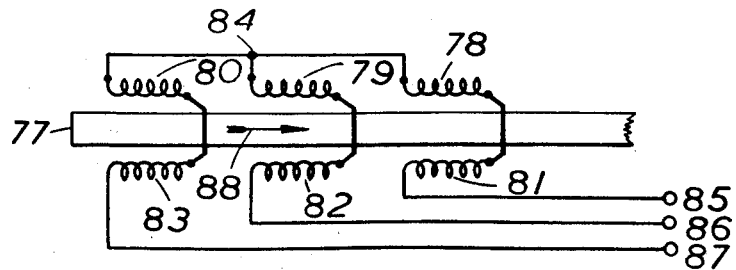

Features of the invention are disclosed in the ensuing description made with reference to the drawings, Figs. 1 to 5 of which are diagrams of current distribution in the ducts of various forms of induction type liquid metal pumps, Fig. 6 is an exploded perspective view of a pump according to the invention (fixing and clamping bolts and electrical windings have been omitted for the sake of clarity) and Fig. 7 is a wiring diagram.

Figures 1, 2, 3:
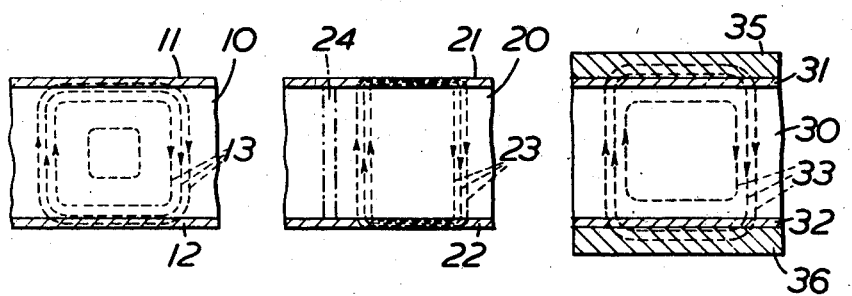

Fig. 1 shows the current distribution for a pump comprising a duct 10 having thin metal walls 11, 12. The current paths 13 lie almost wholly within the liquid metal in the duct. The distribution of the total current between that circulating wholly in the metal and that circulating partly in the walls is governed by features such as the resistivity of the liquid metal, the resistance of the walls, the contact resistance between the liquid metal and the walls and the nature of the magnetic field.

In the ideal arrangement shown in Figure 2 the magnetic field across any element of the duct 20, such as element 24, is uniform, a resistance free path is provided by the walls 21, 22 of the duct and there is no contact resistance. The current paths 23 in the liquid metal are transverse to the direction of liquid metal flow and turbulence is minimized. The E. M. F. $e$ induced in the element 24 is equal to the product of the current $\iota$ flowing in the element and the resistance $r$ of it, that is: $e = \iota r$.

Figures 4, 5:
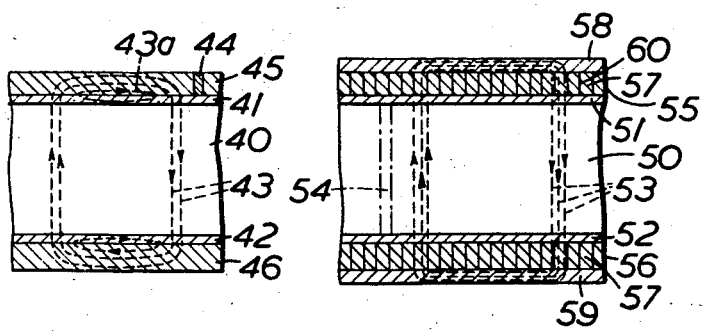

This simple relationship does not hold when ideal conditions are departed from, for example, when resistance external to the liquid metal is introduced in the current paths. However, conditions can be set up so that the current through the liquid metal behaves as if ideal conditions did, in substance, exist. As a first step in this direction modifications to the duct for the liquid metal are introduced as shown in Figure 3. The duct 30 is provided with walls 31, 32 having thick bars of copper 35, 36 brazed thereto. This, in effect, reduces the resistance of the walls in a direction along the duct. The bars 35, 36 may be inside or outside duct 30. The current paths 33 are of the form shown. A further modification is shown in Figure 4, wherein the magnetic field is extended to cut the copper bars 45, 46 brazed to the walls 41, 42 of the duct 40. Additional E. M. F.'s are created in the bars which are in series with the E. M. F. induced in the liquid metal. These additional E. M. F.'s may be made of appropriate magnitude to balance the ohmic drop in the current paths outside the liquid metal. The resistivity of the liquid metal is assumed to be substantially larger than that of the copper of the bars 45, 46. The current paths 43 through the liquid metal are of the form shown.

When the E. M. F. induced per unit length of element, such as element 44, of the copper is greater than the ohmic drop, circulating currents 43a appear in the copper. These may be reduced by slotting the bars as shown in Fiigiure 5. In this figure, the duct 50 has walls 51, 52 to which are brazed copper bars 55, 56 made up of teeth 57. The teeth are electrically separated by insulators 60 or air spacing where they lie in or near the magnetic field and they are electrically connected by bars 58, 59 outside the magnetic field. The walls of the tube are made very thin so that the shunt resistance path they offer to the teeth 57 is greater than the resistance of the teeth. About 20 teeth per wavelength may be used. The current paths 53 are substantially as shown.

If the length of the teeth 57 in the magnetic field is greater than that required to induce an E. M. F. adequate to balance the external ohmic drop a condition may arise in which the E. M. F. in an element such as element 54 may be less than the product of the current and resistance of that element and curved current paths result.

In Fig. 6 the pump consists of three assemblies, the top lamination assembly 61, the duct assembly 62 and bottom lamination assembly 63. Assemblies 61 and 63 are similar, they each comprise magnetic steel laminations 64 clamped together by bolts passing through holes 65 and provided with conductor slots 66. Brackets 67 are also provided for clamping the pump together by bolts through holes 68. The duct assembly 62 has a rectangular section duct 69 made from the material known as "Nimonic"—a nickel/chromium alloy. This material has a poor conductivity relative to the better known conductors such as copper and this quality is advantageous in that it minimises current flow in the walls of the duct. The duct 69 has end-flanges 70, 71 welded to it and slotted copper side bars 72, 73 brazed to its narrow side walls. The greater dimension of the duct 69 is such that when the lamination assemblies 61, 63 are clamped in position the laminations overlap two thirds of the depth of the slots 74 in the side bars 72, 73. Lugs 75 are provided on the back faces of the flanges. A series of clamps shown by the chain-dotted lines 76 augment the clamping provided at lugs 75 to minimize vibration and noise. Clamping pressure is taken along the length of the side bars as well as at the lugs 75. Asbestos paper is provided between the assemblies 61, 63 and the metal duct 69 to insulate the laminations from the duct. The frequency of operation is twenty-five cycles per second.

In Fig. 7, the wiring of the pump of Fig. 6 is shown diagrammatically. The narrow wall 77 of the channel is shown with windings 78, 79, 80 for structure 61 of Fig. 6 and windings 81, 82, 83 for structure 63 of Fig. 6. Connection 84 is the star point of the three-phase system and terminals 85, 86, 87 are the three phase input. Coils 80 and 83 are in the first phase, coils 79 and 82 are in the second phase and coils 78 and 81 are in the third phase so that a travelling wave is set up in the direction of arrow 88. The windings are formed so as to give the pump six poles.

I claim:
1. An induction type liquid conductor pump comprising a thin wall flat rectangular section metal duct, a magnetic structure clamped to each wide wall of the duct and substantially coextensive therewith, insulating material between the magnetic structure and the wide wall of the duct, the face of each magnetic structure adjacent the duct being formed with a series of transverse slots, distributed polyphase windings in said slots for generating a wave of magnetic field traveling in a direction along the duct, and conductor bars at least one wavelength long secured in electrical contact along the outside of the narrow walls of the duct, said bars being slotted across the face in contact with the narrow walls of the duct.

2. An induction type liquid conductor pump as claimed in claim 1 wherein the magnetic structures overlap the sides of the wide wall of the duct so as to cover the conducting bars by an amount less than the depth of the slots in said bars.

References Cited in the file of this patent
UNITED STATES PATENTS

| | | |
|---|---|---|
| 2,317,166 | Abrams | Apr. 20, 1943 |
| 2,339,964 | Tama | Jan. 25, 1944 |
| 2,397,785 | Friedlander | Apr. 2, 1946 |
| 2,541,841 | Tama | Feb. 13, 1951 |
| 2,558,698 | Wade | June 26, 1951 |

FOREIGN PATENTS

| | | |
|---|---|---|
| 586,276 | Great Britain | Mar. 13, 1947 |

OTHER REFERENCES

Publication: Argonne National Laboratory Report No. 4317 (also known as AECD, 3431; "Electromagnetic Pump for Liquid Metals" by A. H. Barnes, F. A. Smith and G. K. Whitham, pages 1–8, 11–12) July 15, 1949.

Publication: Argonne National Laboratory Report No. 4273; ("Reactor Engineering Division Report for the Period Dec. 1, 1948 through Feb. 28, 1949," W. H. Zinn, director), Apr. 5, 1949.

Publication: Liquid Metals Handbook, pages 156–161, June 1, 1950.